United States Patent
Zink et al.

(10) Patent No.: US 11,503,265 B2
(45) Date of Patent: *Nov. 15, 2022

(54) RENDERING EXTENDED VIDEO IN VIRTUAL REALITY

(71) Applicant: Warner Bros. Entertainment Inc., Burbank, CA (US)

(72) Inventors: Michael Zink, Escondido, CA (US); Mercedes Christine Cardenas, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,480

(22) Filed: Jul. 19, 2021

(65) Prior Publication Data

US 2022/0014724 A1    Jan. 13, 2022

Related U.S. Application Data (63) Continuation of application No. 16/530,899, filed on Aug. 2, 2019, now Pat. No. 11,070,781, which is a
(Continued)

(51) Int. Cl.
*H04N 13/111* (2018.01)
*H04N 13/332* (2018.01)
(Continued)

(52) U.S. Cl.
CPC ......... *H04N 13/111* (2018.05); *H04N 13/282* (2018.05); *H04N 13/332* (2018.05); *H04N 13/366* (2018.05)

(58) Field of Classification Search
CPC .. H04N 13/111; H04N 13/332; H04N 13/282; H04N 13/366
See application file for complete search history.

(56) References Cited

U.S. PATENT DOCUMENTS 6,445,815 B1    9/2002  Sato
6,690,337 B1 *  2/2004  Mayer, III  ............... H04N 9/12
                                                  345/9
(Continued)

FOREIGN PATENT DOCUMENTS

CN    102067593    5/2011

OTHER PUBLICATIONS

EP, 18748018.1 Extended Search Report, dated Oct. 26, 2020.
WO, PCT/US18/16676 ISR and Written Opinion, dated May 31, 2018.
WO, Extended European Search Report, dated Oct. 26, 2020.

*Primary Examiner* — Brian P Yenke
(74) *Attorney, Agent, or Firm* — One LLP (57) ABSTRACT

A method for transforming extended video data for display in virtual reality processes digital extended video data for display on a center screen and two auxiliary screens of a real extended video cinema. The method includes accessing, by a computer executing a rendering application, data that defines virtual screens including a center screen and auxiliary screens, wherein tangent lines to each of the auxiliary screens at their respective centers of area intersect with a tangent line to the center screen at its center of area at equal angles in a range of 75 to 105 degrees. The method includes preparing virtual extended video data at least in part by rendering the digital extended video on corresponding ones of the virtual screens; and saving the virtual extended video data in a computer memory. A corresponding playback method and apparatus display the processed data in virtual reality.

14 Claims, 8 Drawing Sheets

Related U.S. Application Data continuation of application No. PCT/US2018/016676, filed on Feb. 2, 2018.

(60) Provisional application No. 62/454,625, filed on Feb. 3, 2017.

(51) Int. Cl.
 H04N 13/282 (2018.01)
 H04N 13/366 (2018.01)

(56) References Cited

U.S. PATENT DOCUMENTS

| | | | |
|---|---|---|---|
| 6,795,972 | B2 | 9/2004 | Rovira |
| 7,666,096 | B2 | 2/2010 | Novelo |
| 8,206,218 | B2 | 6/2012 | Gutierrez Novelo |
| 8,576,276 | B2 | 11/2013 | Bar-Zeev et al. |
| 9,396,588 | B1 | 7/2016 | Li |
| 9,479,732 | B1 * | 10/2016 | Saleh ................... H04N 5/232 |
| 9,532,027 | B2 | 12/2016 | Nolan et al. |
| 9,787,958 | B2 | 10/2017 | Hattingh et al. |
| 9,898,861 | B2 | 2/2018 | Hattingh |
| 9,997,199 | B2 | 6/2018 | Gewickey et al. |
| 10,044,984 | B1 | 8/2018 | Lyren |
| 10,063,822 | B2 | 8/2018 | Hattingh et al. |
| 10,091,486 | B2 | 10/2018 | Choe et al. |
| 10,096,160 | B2 | 10/2018 | Choi |
| 10,109,320 | B2 | 10/2018 | Gewickey et al. |
| 10,127,725 | B2 | 11/2018 | Kohler et al. |
| 10,165,326 | B1 | 12/2018 | Kline et al. |
| 10,249,091 | B2 | 4/2019 | DeFaria et al. |
| 10,276,211 | B2 | 4/2019 | Gewickey et al. |
| 10,289,193 | B2 | 5/2019 | Hardy et al. |
| 10,372,289 | B2 | 8/2019 | Rao et al. |
| 10,410,675 | B2 | 9/2019 | Gewickey et al. |
| 10,438,418 | B2 | 10/2019 | Iwai et al. |
| 10,453,272 | B2 | 10/2019 | Bates |
| 10,460,497 | B1 | 10/2019 | Steinbach et al. |
| 10,497,399 | B2 | 12/2019 | Gewickey et al. |
| 10,511,895 | B2 | 12/2019 | DeFaria et al. |
| 10,559,060 | B2 | 2/2020 | Noh et al. |
| 10,567,728 | B2 | 2/2020 | Bruls et al. |
| 10,593,027 | B2 | 3/2020 | Guillotel et al. |
| 10,602,200 | B2 | 3/2020 | Grant et al. |
| 10,629,158 | B2 | 4/2020 | Itakura et al. |
| 10,657,727 | B2 | 5/2020 | DeFaria et al. |
| 10,776,899 | B2 | 9/2020 | Katz et al. |
| 10,827,233 | B2 | 11/2020 | DeFaria et al. |
| 10,872,233 | B2 * | 12/2020 | Takagi ................... G06F 3/016 |
| 10,924,817 | B2 | 2/2021 | DeFaria et al. |
| 10,948,730 | B2 * | 3/2021 | Vlachos ............ G02B 27/0189 |
| 2008/0304010 | A1 | 12/2008 | Keane et al. |
| 2009/0244257 | A1 | 10/2009 | MacDonald et al. |
| 2010/0151944 | A1 | 6/2010 | Novelo |
| 2012/0264515 | A1 | 10/2012 | Gutierrez Novelo |
| 2012/0300469 | A1 | 11/2012 | Jorgensen et al. |
| 2013/0181901 | A1 | 7/2013 | West |
| 2014/0013228 | A1 | 1/2014 | Hutten |
| 2014/0016099 | A1 | 1/2014 | Choi et al. |
| 2014/0307069 | A1 | 10/2014 | Gutierrez Novelo |
| 2015/0049004 | A1 | 2/2015 | Deering et al. |
| 2015/0097858 | A1 | 4/2015 | Miki et al. |
| 2016/0054648 | A1 | 2/2016 | Read et al. |
| 2016/0063762 | A1 | 3/2016 | Heuvel et al. |
| 2016/0148433 | A1 | 5/2016 | Petrovskaya et al. |
| 2016/0191893 | A1 * | 6/2016 | Gewickey ............ G11B 27/031 386/234 |
| 2016/0286195 | A1 * | 9/2016 | Lehman ................ G06T 19/006 |
| 2017/0004648 | A1 | 1/2017 | Li |
| 2017/0056770 | A1 | 3/2017 | Gutierrez Novelo |
| 2017/0103576 | A1 * | 4/2017 | DeFaria ................. G06F 3/013 |
| 2017/0105052 | A1 * | 4/2017 | DeFaria ............. H04N 21/4334 |
| 2017/0287220 | A1 | 10/2017 | Khalid et al. |
| 2018/0005429 | A1 | 1/2018 | Osman et al. |
| 2018/0164952 | A1 | 6/2018 | Yao |
| 2018/0293041 | A1 | 10/2018 | Harviainen |
| 2018/0295351 | A1 | 10/2018 | Ninan et al. |
| 2018/0295352 | A1 | 10/2018 | Ninan et al. |
| 2018/0322683 | A1 * | 11/2018 | Dimitrov .............. G06F 3/1431 |
| 2019/0019303 | A1 | 1/2019 | Siver et al. |
| 2019/0020869 | A1 | 1/2019 | Perreault et al. |
| 2019/0094981 | A1 | 3/2019 | Bradski et al. |
| 2019/0176027 | A1 | 6/2019 | Smith et al. |
| 2019/0220952 | A1 | 7/2019 | Lee et al. |
| 2019/0251751 | A1 | 8/2019 | DeFaria et al. |
| 2019/0342632 | A1 * | 11/2019 | DeFaria ................ H04N 13/30 |
| 2020/0057311 | A1 | 2/2020 | Radel et al. |
| 2020/0090702 | A1 | 3/2020 | Gewickey et al. |
| 2020/0145644 | A1 | 5/2020 | Cordes et al. |
| 2020/0177861 | A1 * | 6/2020 | Yokoyama ........... H04N 13/122 |
| 2020/0225737 | A1 | 7/2020 | Limor et al. |
| 2020/0279438 | A1 | 9/2020 | Ohashi |
| 2020/0288112 | A1 | 9/2020 | Sheng |
| 2020/0368616 | A1 | 11/2020 | Delamont |
| 2021/0021798 | A1 * | 1/2021 | Yip ...................... H04N 13/111 |
| 2021/0097875 | A1 * | 4/2021 | Alexander, IV ...... G06F 3/0346 |

\* cited by examiner

RENDERING EXTENDED VIDEO IN VIRTUAL REALITY

CROSS REFERENCE TO RELATED APPLICATIONS

This application is a continuation of U.S. patent application Ser. No. 16/530,899, filed Aug. 2, 2019, which is a continuation of International Patent Application No. PCT/US2018/016676 filed Feb. 2, 2018, which claims priority pursuant to 35 U.S.C. § 119(e) to U.S. Provisional Patent Application Ser. No. 62/454,625 filed Feb. 3, 2017, which applications are hereby incorporated by reference in their entireties.

FIELD

The present disclosure relates to methods and apparatus for use of extended video data in virtual reality.

BACKGROUND

"Extended video" is a term of art that refers to presentation of cinema content using three screens: a center screen, and auxiliary screen on each side of the center screen. Each auxiliary screen is angled towards the audience, while the center screen faces the audience in a traditional manner. The auxiliary screens partially enclose the cinema audience along the sidewalls of the auditorium, providing a more immersive experience. Traditionally, cinematic content is produced only for one screen located on the front wall of the auditorium, which becomes the center screen in an extended video setup. Recently, extended content has been produced for display on the auxiliary screens of extended video setups. One such extended video content is marketed under the name ScreenX™. As used herein, "digital extended video data" means video data for cinema presentation on a center screen and at least two opposing auxiliary screens one on each side of the center screen wherein the video data for each screen is distinct from video data for other screens, in a digital video format.

"Virtual reality" is a term that has been used for various types of content that simulates immersion in a three-dimensional (3D) world, including, for example, various video game content, and animated film content. Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene.

The immersive effect of VR may be provided or enhanced by motion sensors in the headset that detect motion of the user's head, and adjust the video display(s) accordingly. By turning his head to the side, the user can see the virtual reality scene off to the side; by turning his head up or down, the user can look up or down in the virtual reality scene. The headset may also include tracking sensors that detect position of the user's head and/or body, and adjust the video display(s) accordingly. By leaning or turning, the user can see the virtual reality scene from a different point of view. This responsiveness to head movement, head position and body position greatly enhances the immersive effect achievable by the headset. The user may also move around the scene, in some implementations. The user may be provided the impression of being placed inside or "immersed" in the virtual reality scene. As used herein, "immersive" encompasses both VR and AR.

Fully immersive, high quality content is sometimes more difficult to produce than content prepared for a single screen, such as when incorporating video shot on actual sets. At the same time, the current market size for VR content is relatively small, compared to single-screen content. These economic realities have reduced the availability of high-quality entertainment for VR users. One approach to increasing the number of content titles available to VR users is to reformat traditional cinematic content for display on a "virtual screen" in a "virtual cinema" modeled in a VR-compatible data format, for example by transforming 2D or 3D video content in a video texture of screen that matches the proportions and geometry of the screen for which the content was produced. Such reformatting of available content is relatively cost-effective. Thus, a user can enjoy the same content as made available for the cinema or home theater using a VR headset, as a matter of convenience or to avoid the cost of bulkier home theater equipment.

The impression on the user of viewing traditional content in VR is similar to watching the content in a traditional theater or home theater, while also providing the content producer with the capacity to enhance some or all of the content for the VR environment, if desired. Placing the screen at some virtual distance from the rendered viewpoint, and optionally rendering theater seats between the viewpoint and the screen, creates the impression of being in a theater. To fit the screen dimensions, a portion of the VR screen space lacks video content, diminishing the immersive quality of the VR experience.

Figure 1:
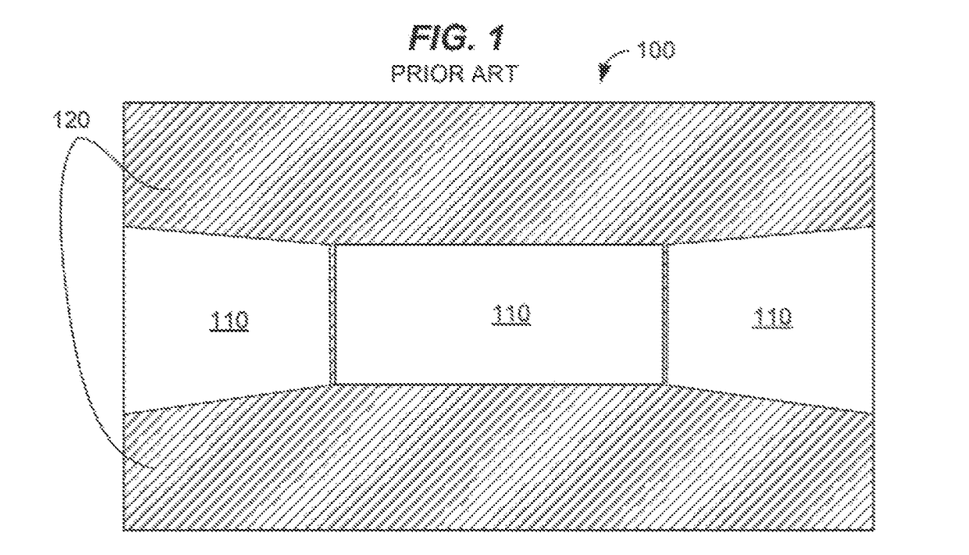
FIG. 1 is a screenshot showing results of a prior method for rendering extended video in virtual reality.

Extended video can similarly be formatted for display in VR, by modeling the center and auxiliary screens and rendering a corresponding video texture on each modeled screen. A common approach includes modeling the screens so that all are visible at once, and so that the virtual screens mimic or resemble the actual extended video screens that the content is produced for. The effect of this approach is shown in FIG. 1, showing an approximation of a virtual reality screenshot 100 for a prior art virtual extended video application. When the auxiliary screens of extended video setups are modeled in virtual reality, the video content appears in a relatively narrow band 110. A large portion 120 of the virtual reality display merely displays black or other static content. As a result, the display of extended video in virtual reality degrades the immersive effect of virtual reality even more so than with traditional, single-screen video. Nor is there any obvious solution to the problem of configuring extended video content so as to result in an appealing display for the typical VR user and avoid distortion of the video content or the need for extensive remastering.

It would be desirable, therefore, to develop new methods for transforming extended video content for use with virtual reality headset display equipment, that overcome these and other limitations of the prior art, and enhance the appeal and enjoyment of narrative video content for new immersive technologies such as VR.

SUMMARY

This summary and the following detailed description are complementary parts of an integrated disclosure, and may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as will be apparent from the respective disclosures.

In an aspect of the disclosure, a computer-implemented method for transforming extended video data for display in virtual reality includes receiving digital extended video data for display on a center screen and two auxiliary screens of a real extended video cinema. The method may further include accessing, by a computer executing a rendering application, data that defines virtual screens including a center screen and auxiliary screens, wherein tangent lines to each of the auxiliary screens at their respective centers of area intersect with a tangent line to the center screen at its center of area at equal angles in a range of 75 to 105 degrees. In other words, the computer orients and positions the virtual screens such that tangent lines or planes intersect at an angle within the stated range. The method may further include preparing virtual extended video data at least in part by rendering the digital extended video on corresponding ones of the virtual screens, and saving the virtual extended video data in a computer memory. In another aspect of the disclosure, a method for processing extended video data for display by a virtual reality display apparatus, may include receiving, by a virtual reality display apparatus, virtual extended video data for display that defines virtual screens as described for the foregoing method, outputting the virtual extended video data for display using a stereographic display system of the VR headset, and optionally, displaying the virtual extended video data on the display.

In aspects of either or both foregoing methods, the data that defines the virtual screens may further define that the tangents to each of the auxiliary screens are parallel. The data that defines the virtual screens may further define that each of the virtual screens is characterized by a having a cylindrical radius of curvature 'R' in a plane parallel to top and bottom edge of each virtual screen. In another aspect, the data that defines the virtual screens may further define that a ratio $R/z_2$ wherein '$z_2$' indicates height of each of the virtual screens is in a range of 1 to 4. Either both of the foregoing methods may include accessing data that defines a virtual floor plane parallel to and located a distance '$z_3$' below the bottom edge of each virtual screen, wherein $z_3$ is equal to or within 20% of $0.9*z_2$. The bottom edges of the screens may be vertically aligned. The data that defines the virtual screens may further define that each of the virtual screens has a width 'W' measured along its respective one of the tangent lines such that a ratio $W/z_2$ is in a range of 1.8 to 3.6. The data that defines the virtual screens may further define that the auxiliary screens face each other and are spaced apart a distance '2C' measured at their respective centers of area, wherein a ratio of 2C/W is in a range of 1 to 1.5. In an alternative aspect, the data that defines the virtual screens may define that each of the virtual screens is characterized by a having a spherical radius of curvature with a common center.

Any of the foregoing methods may be implemented in any suitable programmable computing apparatus, by provided program instructions in a non-transitory computer-readable medium that, when executed by a computer processor, cause the apparatus to perform the described operations. An apparatus may include a computer or system of computers used in video production. In other embodiments, an apparatus may include a virtual reality device, such as a headset or other display that reacts to movements of a user's head or body to provide the impression of being placed inside of the rendered scene.

To the accomplishment of the foregoing and related ends, one or more examples describe and enable features pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 2:
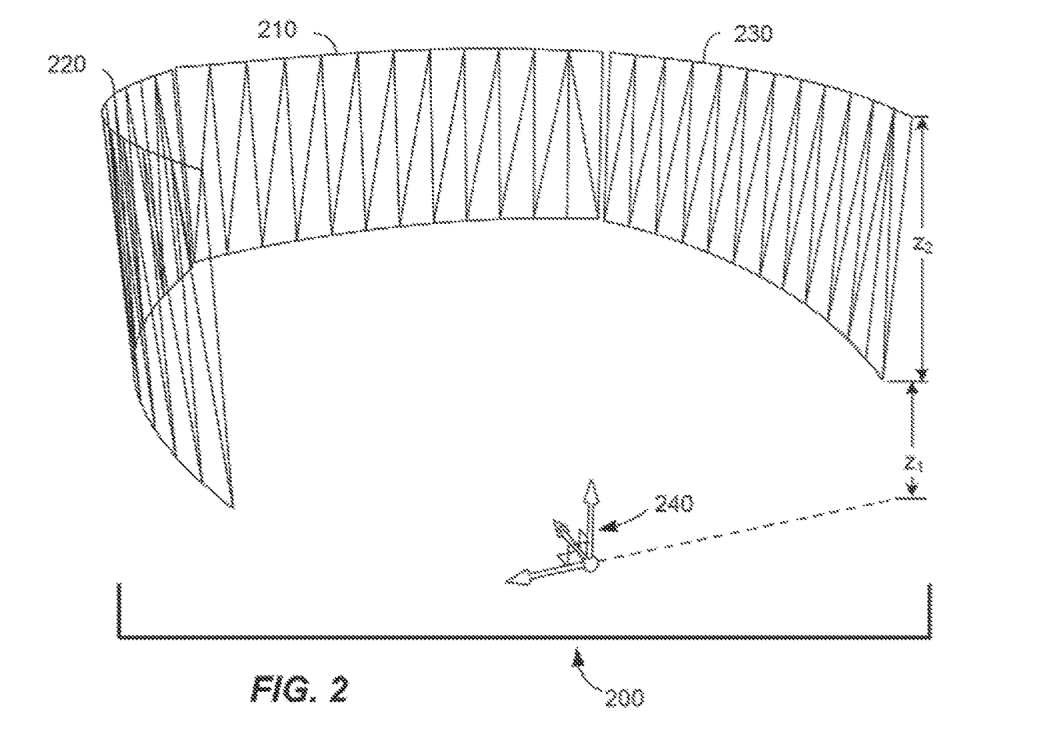
FIG. 2 is a perspective view of a three-dimensional (3D) mesh used for rendering extended video in virtual reality, using a cylindrical geometry.
Figure 3A:
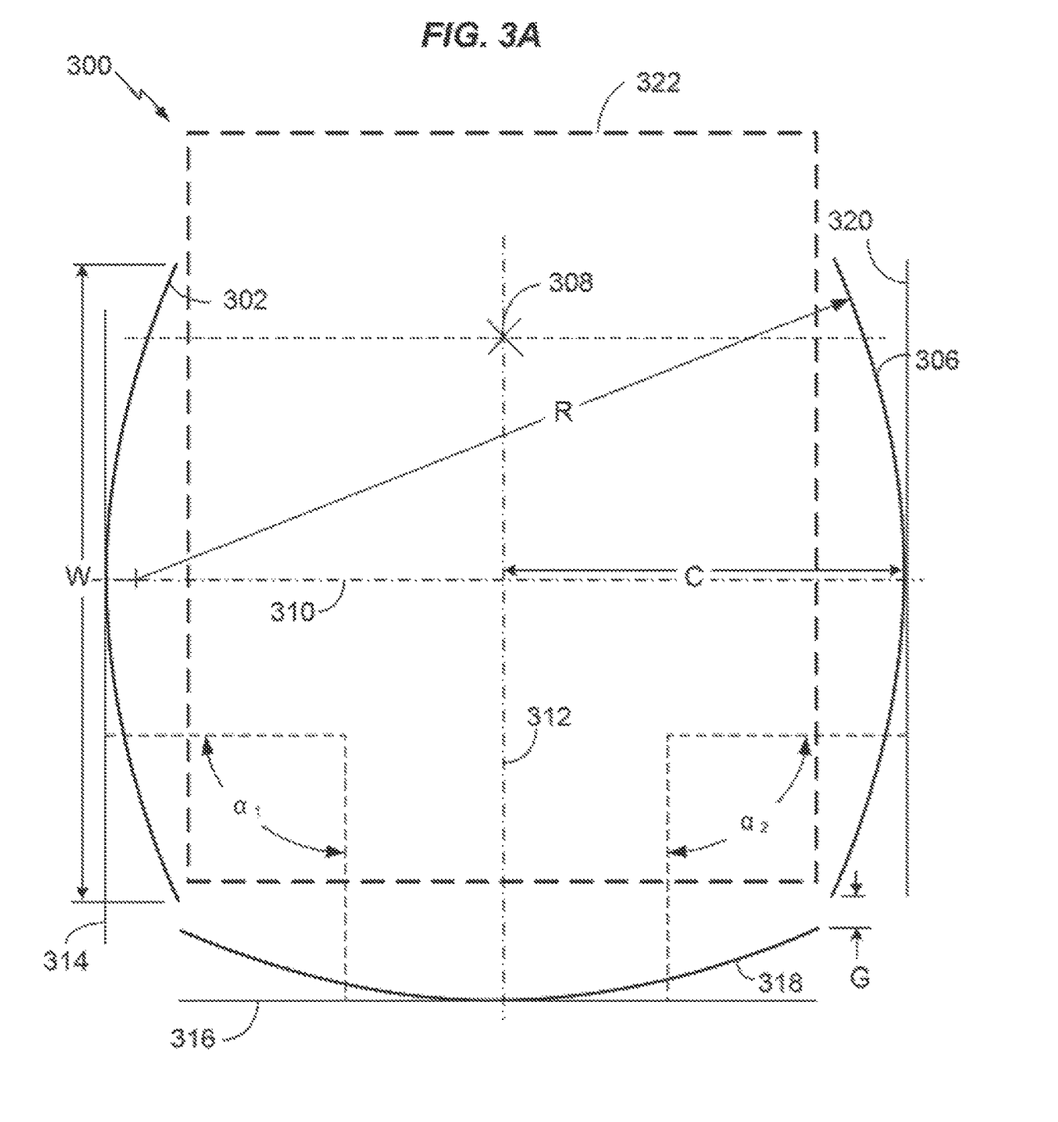
FIG. 3A is a top view of the 3D mesh show in FIG. 2, illustrating certain geometric parameters of the novel mesh for rendering extended video.
Figure 3B:
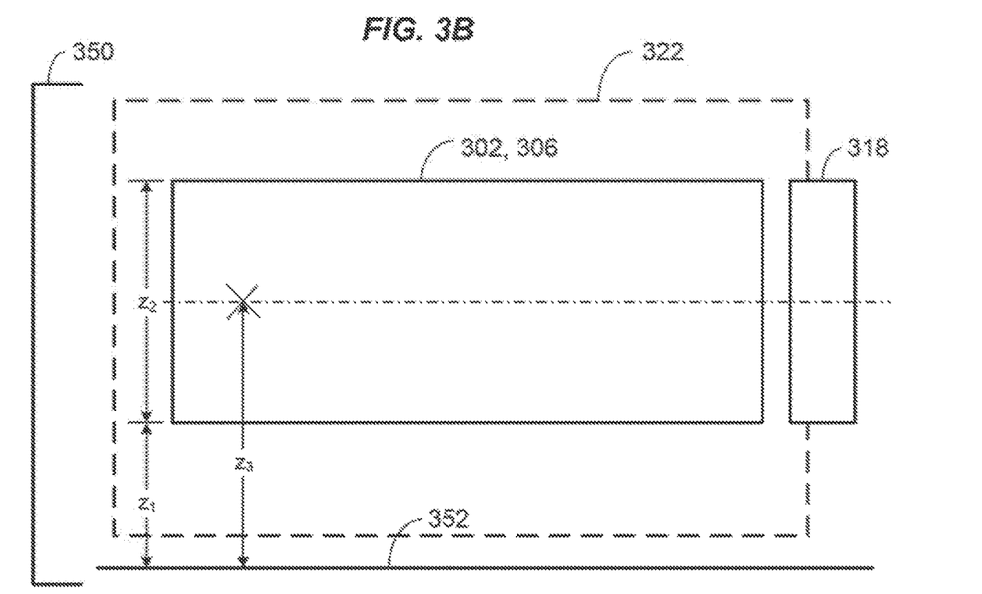
FIG. 3B is a side view of the 3D mesh shown in FIGS. 2 and 3A.

Transforming extended video data for display in virtual reality rendering on virtual screens including a center screen and specially configured auxiliary screens. The auxiliary screens and their relationship to the center screen are characterized by special geometric parameters that differ from the real auxiliary screens for which the extended video data is produced. FIGS. 2, 3A and 3B illustrate various aspects of these special parameters.

FIG. 2 shows a perspective view of a system 200 of virtual screens including a virtual center screen 210, a virtual left auxiliary screen 220 and a virtual right auxiliary screen 230. Each of the virtual screens 210, 220, 230 are modeled as a three-dimensional (3D) mesh in a virtual space denoted by the Cartesian tri-axial icon 240. The virtual space can be defined using any suitable coordinate system, but it may be convenient to use a system having its origin centered between the left 220 and right 230 virtual screens and located on a base plane or virtual floor. In the illustrated system 200, the lower edges of all the virtual screens 210, 220, 230 are vertically aligned in a plane parallel to and located a distance '$z_1$' above a floor plane. The upper edges of the virtual screens are in a second plane also vertically aligned parallel to the floor plane and located a distance '$z_2$' above it. Units used for the virtual coordinate system are arbitrary, but the scale of the virtual screens 210, 220, 230 relative to a reference floor does impact the user experience. Advantageously, the scale may be selected such that motion of the user in the real world while wearing virtual reality gear corresponds 1-to-1, within the limits of human perception, to movement of the virtual viewpoint. For example, the scale may be selected such that real movement of 100 centimeters corresponds to virtual movement of the virtual viewpoint that is 100 virtual centimeters in the same direction, or that is about 100 virtual centimeters such that most users will not notice discrepancies between real and actual movement. For further example, in one embodiment, $z_1$=300 cm and $z_2$=330 cm. Further geometric parameters are discussed below in connection with FIGS. 3A-B.

FIG. 3A shows a top view 300 of a virtual screen setup including a center virtual screen 318, a left (from the user's point of view) auxiliary screen 306 and a right auxiliary screen 302. The marker 308 indicates a default position of the virtual viewpoint, along the centerline 312 of the center screen 318 and slightly forward of the rear edges of the auxiliary screens 302, 306. When first activating the virtual viewing space, the user's viewpoint for rendering the virtual screens may be placed at the indicated default location 308, or at a similar location that affords a balanced peripheral view of the auxiliary screens 302, 306 and that is aligned with and oriented towards a center of the center screen 318, for example, towards a center of area or aligned with a vertical center line of the center screen 318.

In some embodiments, the user may be free to move about within the virtual space, based on feedback from motion sensors in the virtual reality gear or ancillary input device. In such embodiments, it may be desirable to limit virtual movement to a confined area, for example to a defined volume 322 as indicated by the dashed rectangle. Such limits prevent the user from inadvertently or intentionally moving to a position where the video content on the virtual screens cannot readily be seen or that is disorienting to the user.

Each of the virtual screens 302, 306, 318 may be of the same, or approximately the same, size and shape. The computer positions and orients the virtual auxiliary screens such that imaginary tangent lines 314, 316 to each of the auxiliary screens 302, 320 at their respective centers of area (i.e., where the center line 310 intersects the auxiliary screens 302, 306) intersect with an imaginary tangent line 316 to the center screen at its center of area (i.e., where the center line 312 intersects the center screen 318) at equal angles $\alpha_1 = \alpha_2$. In the illustrated embodiment, $\alpha_1$ and $\alpha_2$ equal 90 degrees. Other values near 90 degrees may also be suitable, for example, $\alpha_1$ and $\alpha_2$ may equal an angle in the range of 75 to 105 degrees.

A small vertically aligned gap of constant width 'G' may be inserted between the center screen 318 and each of the auxiliary screens 302, 306. The purpose of the gap may be to obscure misalignment or other mismatch between the content appearing on the center screen and that appearing on the auxiliary screens and/or to avoid the appearance of a crease where the screens meet. The gap may be selected to match a similar gap in real extended video setups, to minimize processing required in adapting extended video content to virtual reality. In the Illustrated embodiment, the gap 'G' is 20 cm.

In an aspect, each of the screens 302, 318, 306 may be characterized by having a cylindrical radius of curvature 'R' in a plane parallel to top and bottom edge of each virtual screen. Flat virtual screens may be used, but cylindrically curved screens as depicted in the FIGS. 2-3B are believed to provide a greater immersive effect while avoiding noticeable distortion of extended video output. In a human-scale setup, the value of 'R' may be based on one or more pertinent screen measurements. For example, 'R' may be based on a ratio $R/z_2$ to a desired value of '$z_2$', which indicates height of each of the virtual screens above a floor or reference plan. In the illustrated embodiment, 'R' is about 840 cm and '$z_2$' is about 300 cm, for a ratio of $R/z_2$ equal to about 2.8. Other ratios near 2.8 may also be suitable, for example, a ratio in a range of 1 to 4, or higher. The ratio $R/z_2$ for flat virtual screens is infinite, because the radius 'R' is infinite. In an alternative, or in addition, the value of 'R' may be based on the distance from the default viewpoint 308 to the screen 318 along the centerline 312. In the illustrated embodiment, this distance is also about 840 cm.

Each of the virtual screens 302, 318, 306 has a width 'W' measured along its respective one of the tangent lines 314, 316, 320 such that a ratio of screen width to screen height ($W/z_2$) is in a range of 1.8 to 3.6. In the illustrated embodiment, the width is 790 cm and the height is 330 cm, so this ratio is about 2.4. The virtual auxiliary screens 302, 306 face each other, are symmetrically arranged on opposite sides of the center screen 318 and are spaced apart a distance '2C' measured at their respective centers of area, wherein a ratio of 2C/W is in a range of 1 to 1.5. In the illustrated embodiment, the distance 'C' is 490 cm, so the ratio of 2C/W is about 1.24.

Referring to FIG. 3B, a side view 350 of the same screens as shown in FIG. 3A is illustrated. The auxiliary screens 302, 306 are fully overlapping in this view, which appears the same whether taken from the right or the left. The center screen 318 appears at the far right of the figure. A side view of the motion constraint volume 322 is indicated by the dashed rectangle. As noted previously, the screen configuration may include a virtual floor plane 352 parallel to and located a distance below the bottom edge of each virtual screen 302, 306, 318. The distance $z_2$ indicates the screen height between its top and bottom edges. The value of $z_1$ may be equal to or within 20% of $0.9*z_2$. For example, for a screen height of 330 cm, the height of the bottom edge (i.e., screen elevation or '$z_1$') may be about 300 cm.

The distance $z_3$ indicates the height of the default viewpoint above the floor plane 352. In the illustrated embodiment, the distance $z_3$ is equal to one-half of the screen height $z_2$ plus $z_1$, which for this embodiment is 165+300=465 cm. The viewpoint height may thus be determined from the screen height $z_2$ and elevation $z_1$. Ratios of screen height to width may be as described above. The ratio of $z_3/z_2$ may be equal to 1.4, or in the range of 0.5 (when the screen touches the floor) to about 2. A range of about 1.3 to 1.5 may be preferable for most setups. In some embodiments, the screen elevation $z_1$ may be determined based on the screen height $z_2$ and an estimated or measured real eye height of the user '$h_u$' based on the formula $z_3=h_u=z_2/2+z_1$, which when given $h_u$ and solving for $z_1$ yields $z_1=h_u-z_2/2$. If $z_2/2>h_u$, then $z_1$ should be negative (above the level of the bottom screen edge) and the floor plane 352 should be invisible so that the effect is as standing on glass. For users who prefer a more solid virtual floor, $z_2$ should be selected so that $z_2/2<=h_u$. In a virtual environment, the relative sizes of objects in the environment that determines how the user perceives scale. For example, it makes no difference to the end user if all the virtual dimensions are scaled by some constant value. In the virtual environment, the user has no way of perceiving absolute scale, unless there is some error in rendering due to rendering parameters that are inappropriate for the chosen scale.

Figure 4:
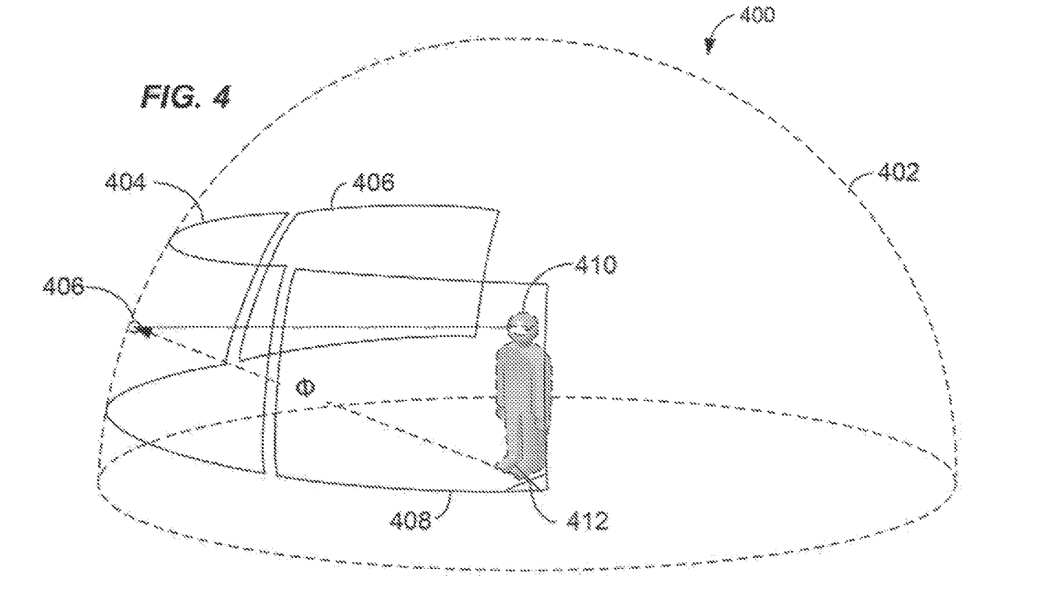
FIG. 4 is a perspective view of an alternative three-dimensional mesh for rendering extended video in virtual reality, using a spherical geometry.

While FIGS. 2-3B show virtual screens with cylindrical curvatures, in an alternative each of the virtual screens 404, 406, 408 may be characterized by having a spherical radius of curvature $\phi$ with a common center 412, as shown in FIG. 4. The effect of the system 400 may be as if the user 410 was standing in a hemispherical chamber of radius $\phi$ or larger on which the extended video content is projected. Other virtual screen dimensions may be as previously described.

Figure 5:
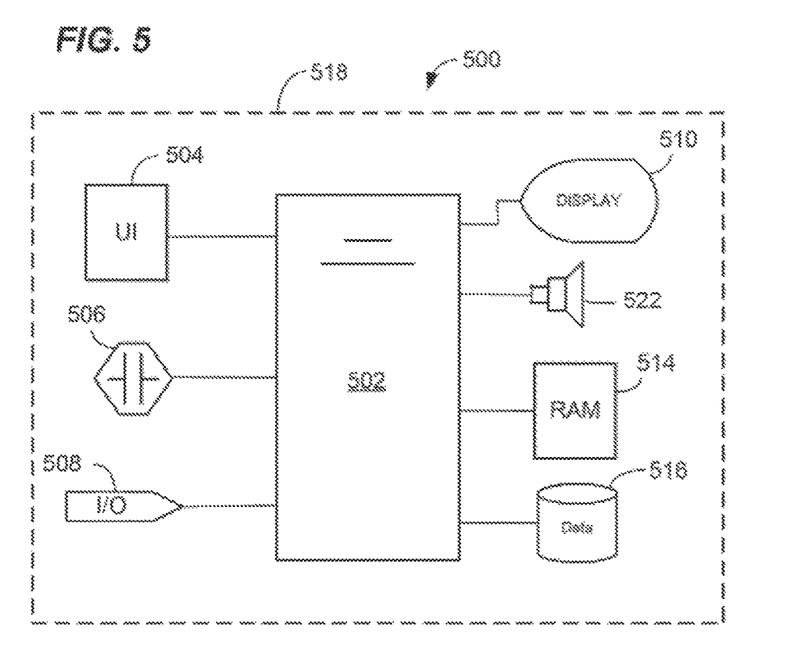
FIG. 5 is a block diagram illustrating a content consumption device for consuming VR or AR content.

The foregoing methods ad concepts may be implemented using any suitable virtual reality (VR) display apparatus. Referring to FIG. 5, aspects of a VR display apparatus 500 are illustrated. The apparatus 500 may include, for example, a processor 502, for example a central processing unit based on 80×86 architecture as designed by Intel™ or AMD™, a system-on-a-chip as designed by ARM™, or any other suitable microprocessor. The processor 502 may be communicatively coupled to auxiliary devices or modules of the VR display apparatus 500, using a bus or other coupling. Optionally, the processor 502 and some or all of its coupled auxiliary devices or modules (examples of which are depicted at 504-516) may be housed within or coupled to a housing 518, for example, a housing having a form factor of a personal computer, gaming console, smart phone, notepad computer, laptop computer, set-top box, wearable googles, glasses, or visors, or other form factor.

A user interface device 504 may be coupled to the processor 502 for providing user control input to an immersive content display process operated by a VR immersive display engine executing on the processor 502. User control input may include, for example, selections from a graphical user interface or other input (e.g., textual or directional commands) generated via a touch screen, keyboard, pointing device (e.g., game controller), microphone, motion sensor, camera, or some combination of these or other input devices. Control input may also be provided via a sensor 506 coupled to the processor 502. A sensor may comprise, for example, a motion sensor (e.g., an accelerometer), a position sensor, a biometric temperature or pulse sensor, a location sensor (for example, a Global Positioning System (GPS) receiver and controller), a multi-camera tracking sensor/controller, an eye-tracking sensor, or a microphone. The sensor 506 may detect a motion or other state of a user interface display, for example, motion of a virtual-reality headset, or the bodily state of the user, for example, facial expression, skin temperature, pupillary response (e.g., pupil dilation), corneal deformation, gaze direction, respiration rate, muscle tension, nervous system activity, or pulse.

The device 500 may optionally include an input/output port 508 coupled to the processor 502, to enable communication between a VR engine and a computer network, for example a cinema content server or home theater server. Such communication may be used, for example, to enable multiplayer VR experiences, including but not limited to shared immersive experiencing of cinematic content. The system may also be used for non-cinematic multi-user applications, for example social networking, group entertainment experiences, instructional environments, video gaming, and so forth.

A display 510 may be coupled to the processor 502, for example via a graphics processing unit (not shown) integrated in the processor 502 or in a separate chip. The display 510 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 510 may be incorporated into a virtual reality headset or other immersive display system. Video output driven by a VR immersive display engine operating on the processor 502, or other application for coordinating user inputs with an immersive content display and/or generating the display, may be provided to the display device 510 and output as a video display to the user. Similarly, an amplifier/speaker or other audio output transducer 522 may be coupled to the processor 502 via an audio processing system. Audio output correlated to the video output and generated by the VR/AR display engine or other application may be provided to the audio transducer 522 and output as audible sound to the user.

The VR display apparatus 500 may further include a random access memory (RAM) 514 holding program instructions and data for rapid execution or processing by the processor during controlling a 3D environment. When the device 500 is powered off or in an inactive state, program instructions and data may be stored in a long-term memory, for example, a non-volatile magnetic, optical, or electronic memory storage device 516. Either or both of the RAM 514 or the storage device 516 may comprise a non-transitory computer-readable medium holding program instructions, that when executed by the processor 502, cause the device 500 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Figure 6:
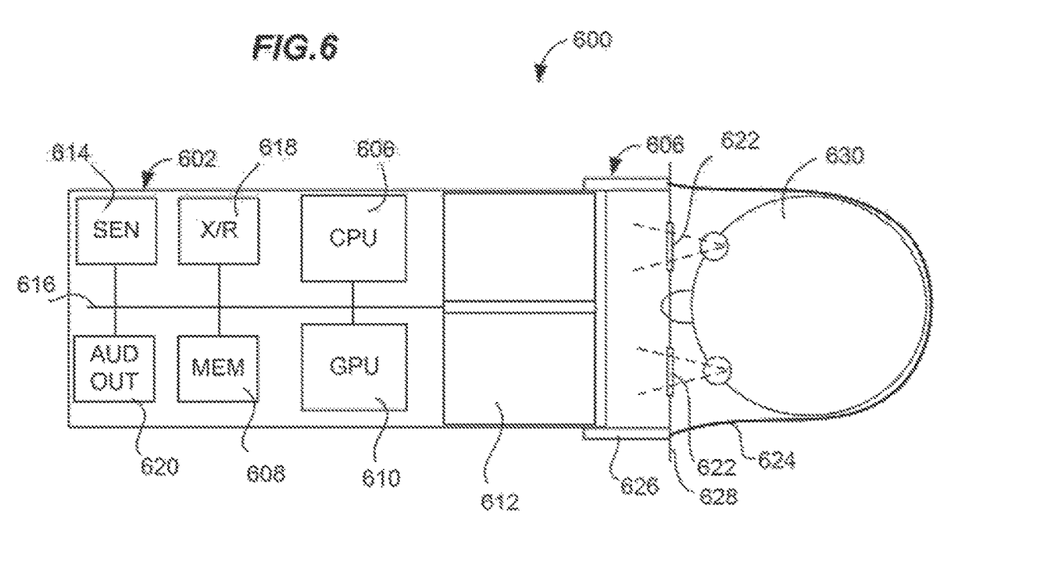
FIG. 6 is a schematic diagram illustrating components of a stereoscopic display device for presenting extended video in virtual reality.

Any of the features described herein may be executed by an application for providing a 3D environment responsive to user input that produces VR output for an immersive VR headset or the like. FIG. 6 is a schematic diagram illustrating one type of an immersive VR stereoscopic display device 600 (also referred to herein as a VR display apparatus) that may be provided in various form factors, of which device 600 provides but one example. The innovative methods, apparatus and systems are not necessarily limited to a particular form factor of immersive VR display, but may be used in a video output device that enables the user to control a position or point of view of video content playing on the device. Likewise, a VR output device may manage an audio position or point of view of audio content playing on the device. The immersive VR stereoscopic display device 600 represents an example of a relatively low-cost device designed for consumer use.

The immersive VR stereoscopic display device 600 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. This modular design may avoid the need for dedicated electronic components for video output, greatly reducing the cost. The device 600 is designed to be worn close to the user's face, enabling a wide field of view using a small screen size such as typically found in present handheld tablet computing or smartphone devices. The support structure 626 may provide a fixed mounting for a pair of lenses 622 held in relation to the display screen 612. The lenses may be configured to enable the user to comfortably focus on the display screen 612 which may be held approximately one to three inches from the user's eyes.

The device 600 may further include a viewing shroud (not shown) coupled to the support structure 626 and configured of a soft, flexible or other suitable opaque material for form fitting to the user's face and blocking outside light. The shroud may be configured to ensure that the only visible light source to the user is the display screen 612, enhancing the immersive effect of using the device 600. A screen divider may be used to separate the screen 612 into independently driven stereoscopic regions, each of which is visible only through a corresponding one of the lenses 622. Hence, the immersive VR stereoscopic display device 600 may be used to provide stereoscopic display output, providing a more realistic perception of 3D space for the user. Two separate displays can also be used to provide independent images to the user's left and right eyes respectively. It should be appreciated that the present technology may be used for, but is not necessarily limited to, stereoscopic video output.

The immersive VR stereoscopic display device 600 may further comprise a bridge (not shown) for positioning over the user's nose, to facilitate accurate positioning of the lenses 622 with respect to the user's eyes. The device 600 may further comprise an elastic strap or band 624, or other headwear for fitting around the user's head and holding the device 600 to the user's head.

The immersive VR stereoscopic display device 600 may include additional electronic components of a display and communications unit 602 (e.g., a tablet computer or smartphone) in relation to a user's head 630. A support structure 604 holds the display and communications unit 602 using restraining device 624 that is elastic and/or adjustable to provide a comfortable and secure snug fit, for example, adjustable headgear. When wearing the support 602, the user views the display 612 though the pair of lenses 622. The display 612 may be driven by the Central Processing Unit (CPU) 602 and/or Graphics Processing Unit (GPU) 610 via an internal bus 616. Components of the display and communications unit 602 may further include, for example, a transmit/receive component or components 618, enabling wireless communication between the CPU and an external server via a wireless coupling. The transmit/receive component 618 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 618 may enable streaming of video data to the display and communications unit 602 from a local or remote video server, and uplink transmission of sensor and other data to the local or remote video server any desired purpose.

Components of the display and communications unit 602 may further include, for example, one or more sensors 614 coupled to the CPU 606 via the communications bus 616. Such sensors may include, for example, an accelerometer/inclinometer array providing orientation data for indicating an orientation of the display and communications unit 602. As the display and communications unit 602 is fixed to the user's head 630, this data may also be calibrated to indicate an orientation of the head 630. The one or more sensors 614 may further include, for example, a Global Positioning System (GPS) sensor indicating a geographic position of the user. The one or more sensors 614 may further include, for example, a camera or image sensor positioned to detect an orientation of one or more of the user's eyes. In some embodiments, a camera, image sensor, or other sensor configured to detect a user's eyes, gaze direction, pupillary response and/or eye movements may be mounted in the support structure 626 and coupled to the CPU 606 via the bus 616 and a serial bus port (not shown), for example, a Universal Serial Bus (USB) or other suitable communications port. The one or more sensors 614 may further include, for example, an interferometer positioned in the support structure 604 and configured to indicate a surface contour to the user's eyes. The one or more sensors 614 may further include, for example, a microphone, array or microphones, or other audio input transducer for detecting spoken user commands or verbal and non-verbal audible reactions to display output. The one or more sensors may include, for example, electrodes or microphone to sense heart rate, a temperature sensor configured for sensing skin or body temperature of the user, an image sensor coupled to an analysis module to detect facial expression or pupil dilation, a microphone to detect verbal and nonverbal utterances, or other biometric sensors for collecting biofeedback data.

Components of the display and communications unit 602 may further include, for example, an audio output transducer 620, for example a speaker or piezoelectric transducer in the display and communications unit 602 or audio output port for headphones or other audio output transducer mounted in headgear 624 or the like. The audio output device may provide surround sound, multichannel audio, so-called 'object oriented audio', or other audio track output accompanying a stereoscopic immersive VR video display content. Components of the display and communications unit 602 may further include, for example, a memory device 608 coupled to the CPU 606 via a memory bus. The memory 608 may store, for example, program instructions that when executed by the processor cause the apparatus 600 to perform operations as described herein. The memory 608 may also store data, for example, audio-video data in a library or buffered during streaming operations. Further details regarding generation and use of VR environments may be as described in U.S. patent application Ser. No. 14/960,379, filed Dec. 5, 2015, which is incorporated herein in its entirety by reference.

Figure 7:
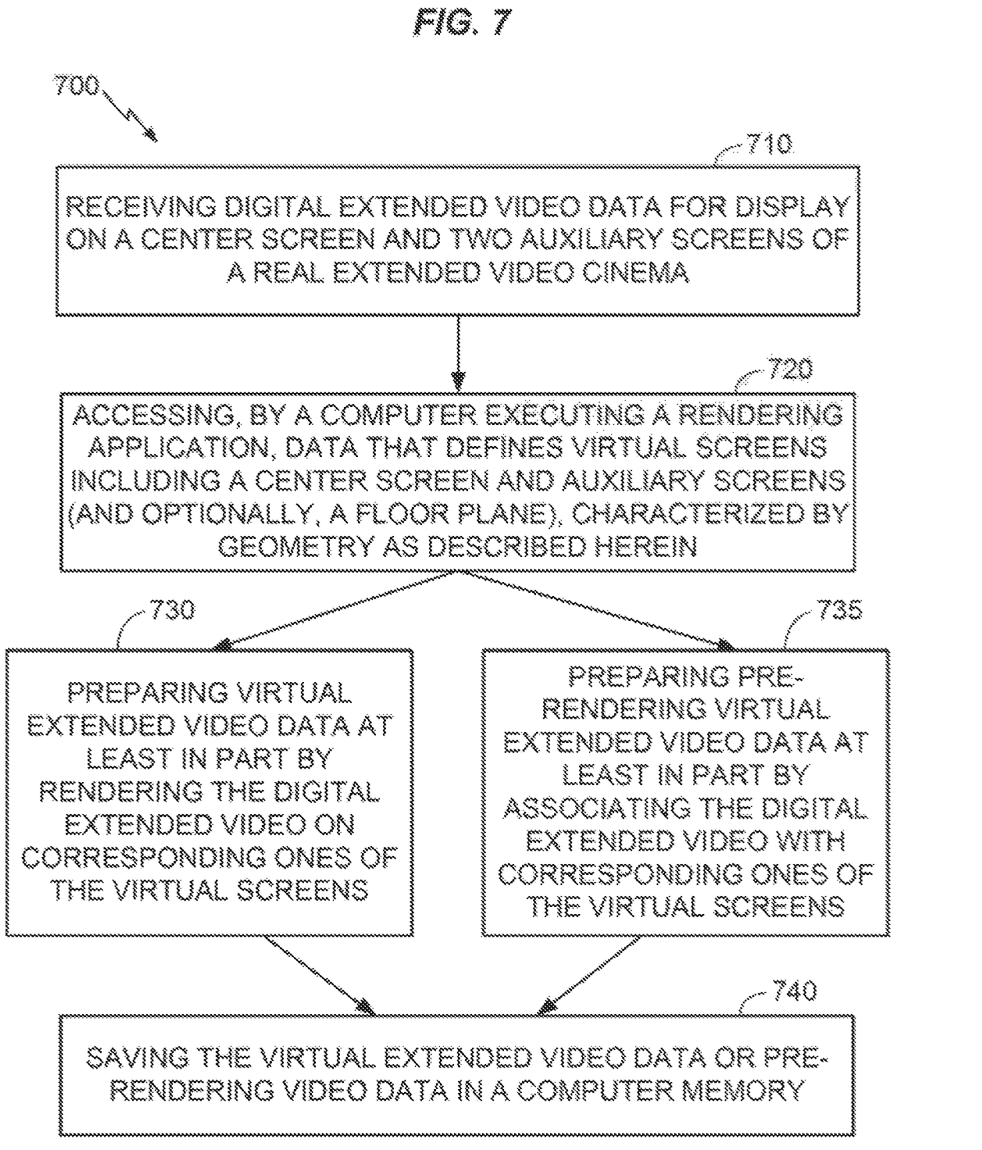
FIG. 7 is a flow chart illustrating a method for transforming extended video for display in virtual reality.

In view the foregoing, and by way of additional example, FIG. 7 shows aspects of a method 700 for transforming extended video data for display in virtual reality. The method 700 may be performed by one or more programmable computers for transforming extended video content into VR content rendered on three screens, for example, by a production computer, by a VR display apparatus as described in connection with FIGS. 5-6, or by any useful combination of the foregoing. The method 700 may include, at 710, receiving digital extended video data for display on a center screen and two auxiliary screens of a real extended video cinema. The extended video data may include 2D video data, 3D (stereoscopic) video data, or both produce for projection or other display on three physical screens in a cinema setting.

The method 700 may include, at 720, accessing, by a computer executing a rendering application, data that defines virtual screens including a center screen and auxiliary screens. The computer may define geometry of the virtual center and auxiliary screens as described above in connection with FIGS. 2-3B. For example, the computer may position and orient the virtual screens such that tangent lines to each of the auxiliary screens at their respective centers of area intersect with a tangent line to the center screen at its center of area at equal angles in a range of 75 to 105 degrees.

The method 700 may include, at 730, preparing virtual extended video data at least in part by rendering the digital extended video on corresponding ones of the virtual screens from a defined viewpoint. The rendering result may further be transformed into one or more formats for use in a virtual reality display device.

For alternative embodiments that support real-time rendering by a downstream VR display apparatus, the method 700 may include, at 735, preparing pre-rendering virtual extended video data at least in part by associating the digital extended video with corresponding ones of the virtual screens, without rendering an output image. In these embodiments, the extended video data is prepared for rendering by or in connection with the downstream VR display device at runtime. This allows the user's viewpoint to move in the virtual reality environment, providing a more immersive experience.

The method 700 may include, at 740, saving the virtual extended memory and/or pre-rendering video data in a computer memory for use by the virtual reality display device. For example, the data may be saved in a file for long term storage, held in a short-term cache for display output, or both.

Figure 8:
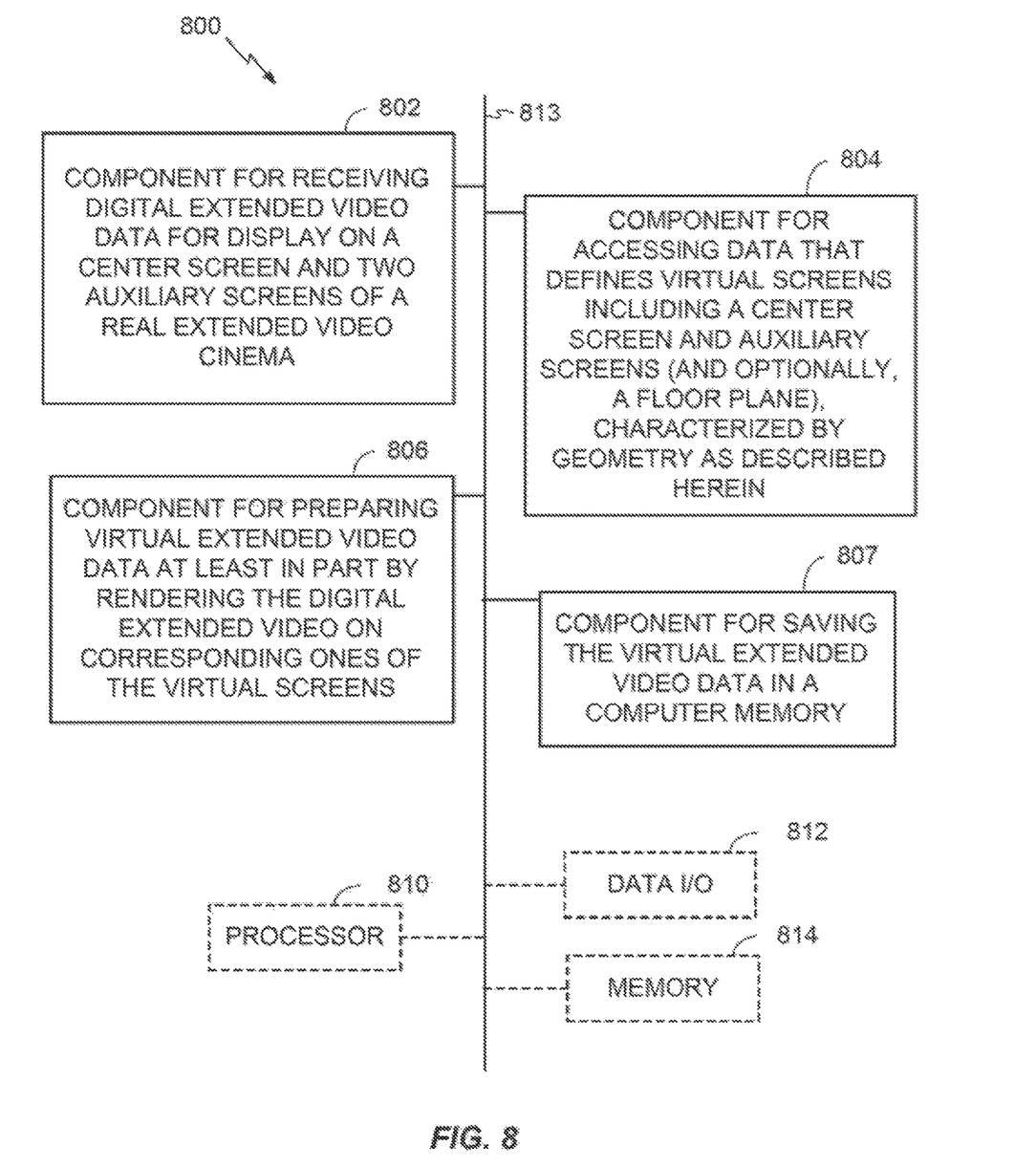
FIG. 8 is a conceptual block diagram illustrating components of an apparatus or system for transforming extended video for display in virtual reality.

FIG. 8 is a conceptual block diagram illustrating components of an apparatus or system 800 for transforming extended video data for display in virtual reality, as described herein. The apparatus or system 800 may include additional or more detailed components for performing functions or process operations as described herein. For example, the processor 810 and memory 814 may contain an instantiation of a process for transforming extended video data for display in virtual reality. As depicted, the apparatus or system 800 may include functional blocks that can represent functions implemented by a processor, software, or combination thereof (e.g., firmware). The apparatus 800 may be a production computer, a VR display apparatus, or a combination of the foregoing.

As illustrated in FIG. 8, the apparatus or system 800 may comprise an electrical component 802 for receiving digital extended video data for display on a center screen and two auxiliary screens of a real extended video cinema. The component 802 may be, or may include, a means for said receiving. Said means may include the processor 810 coupled to the memory 814, and to a data input/output interface 812, the processor executing an algorithm based on program instructions stored in the memory. Such algorithm may include a sequence of more detailed operations, for example, connecting to a node holding the digital extended video data, establishing a data transfer session, and transferring the digital extended video data to a local memory.

The apparatus 800 may further include an electrical component 804 for accessing, by a computer executing a rendering application, data that defines virtual screens including a center screen and auxiliary screens. The virtual center and auxiliary screens may be characterized by geometry as described above in connection with FIGS. 2-3B. The component 804 may be, or may include, a means for said accessing. Said means may include the processor 810 coupled to the memory 814, the processor executing an algorithm based on program instructions stored in the memory. Such algorithm may include a sequence of more detailed operations, for example, opening a data file using a rendering application or a component of a rendering application suite, wherein the data file defines 3D geometry of the virtual center and auxiliary screens in a format readable by the rendering application or component.

The apparatus 800 may further include an electrical component 806 for preparing virtual extended video data at least in part by rendering the digital extended video on corresponding ones of the video screens. The component 806 may be, or may include, a means for said preparing. Said means may include the processor 810 coupled to the memory 814, the processor executing an algorithm based on program instructions stored in the memory. Such algorithm may include a sequence of more detailed operations, for example, for each frame of video data and for each screen, setting rendering parameters based on default values, user input, or both, providing the 3D geometry of the virtual center and auxiliary screens and the rendering parameters to a rendering engine, determining pixel values of a video frame by the rendering engine based on the provided information. In alternative embodiments, the algorithm may include creating pre-rendering data as described at 735 by a production computer and performing the rendering operation in real time by a VR display apparatus. The algorithm may further include, for each screen, compiling rendered frames of video into a digital video file or cache memory for display output.

The apparatus 800 may further include an electrical component 807 for saving the virtual extended video data in a computer memory. The component 807 may be, or may include, a means for said saving. Said means may include the processor 810 coupled to the memory 814, the processor executing an algorithm based on program instructions stored in the memory. Such algorithm may include a sequence of more detailed operations, for example, creating a data file containing the virtual extended video data in a format usable by a VR output device, providing the data file to a memory device, and writing the data file to a memory component of the memory device.

The apparatus 800 may optionally include a processor module 810 having at least one processor. The processor 810 may be in operative communication with the modules 802-807 via a bus 813 or similar communication coupling. The processor 810 may effect initiation and scheduling of the processes or functions performed by electrical components 802-807.

In related aspects, the apparatus 800 may include a data interface module 812 operable for communicating with system components over a computer network. A data interface module may be, or may include, for example, an Ethernet port or serial port (e.g., a Universal Serial Bus (USB) port). In further related aspects, the apparatus 800 may optionally include a module for storing information, such as, for example, a memory device 814. The computer readable medium or the memory module 814 may be operatively coupled to the other components of the apparatus 800 via the bus 813 or the like. The memory module 814 may be adapted to store computer readable instructions and data for effecting the processes and behavior of the modules 802-807, and subcomponents thereof, or the processor 810, or the method 700. The memory module 814 may retain instructions for executing functions associated with the modules 802-807. While shown as being external to the memory 814, it is to be understood that the modules 802-807 can exist within the memory 814.

The apparatus 800 may include a transceiver configured as a wireless transmitter/receiver, or a wired transmitter/receiver, for transmitting and receiving a communication signal to/from another system component. In alternative embodiments, the processor 810 may include networked microprocessors from devices operating over a computer network. In addition, the apparatus 800 may communicate with a stereographic display or other immersive display device for displaying immersive content.

Figure 9:
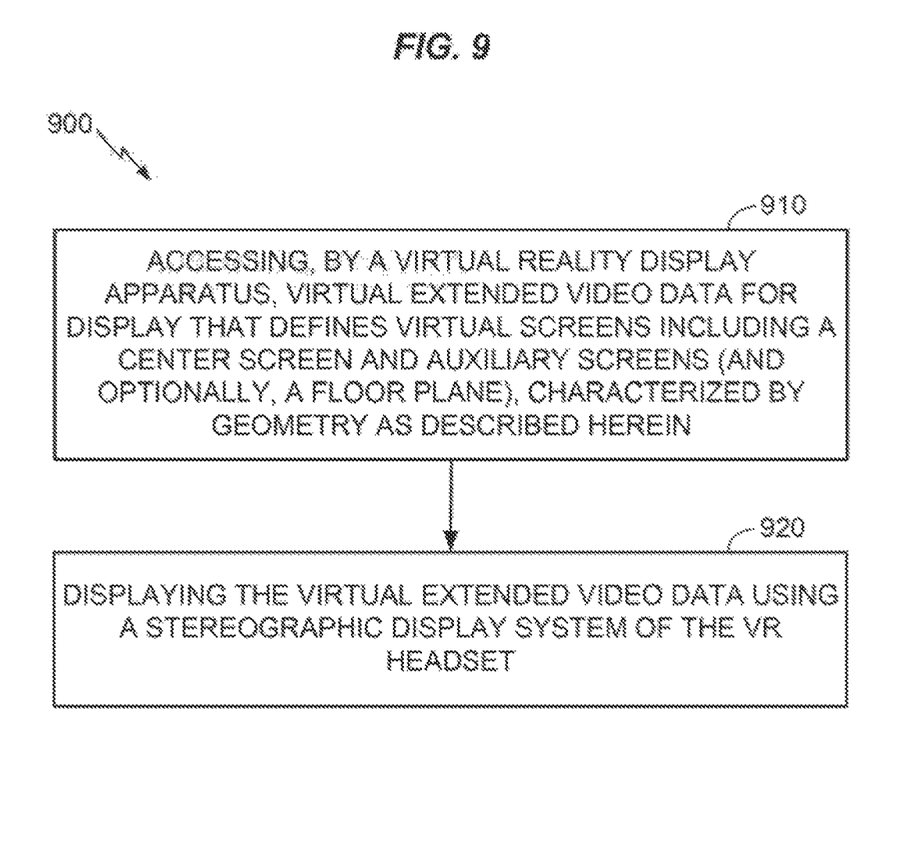
FIG. 9 is a flow chart illustrating a method for presenting extended video in virtual reality.

Referring to FIG. 9, a computer-implemented method for processing extended video data for display by a virtual reality display apparatus may include, at 910, accessing, by a virtual reality display apparatus, virtual extended video data for display that defines virtual screens including a center screen and auxiliary screens. The virtual center and auxiliary screens may be characterized by geometry as described above in connection with FIGS. 2-3B. For example, tangent lines to each of the auxiliary screens at their respective centers of area intersect with a tangent line to the center screen at its center of area at equal angles in a range of 75 to 105 degrees, and other geometric features as have already been described in detail herein above. The method 900 may include, at 920, outputting the virtual extended video data for display using a stereographic display system of the VR headset, and optionally, displaying the virtual extended video data on the display. Any suitable VR display method may be used consistent with the geometry described above. In an aspect, the method 900 may further include receiving output from one or more sensors of the VR display apparatus, changing the rendering viewpoint based on the sensor output, and rendering one or more video frames of the extended video content based on the rendering viewpoint, virtual screen geometry, extended video data and other rendering parameters, to provide a more immersive experience. In such embodiments, the method may further include limiting movement of the rendering viewpoint to within a defined volume 322 as described in connection with FIGS. 3A-B.

Figure 10:
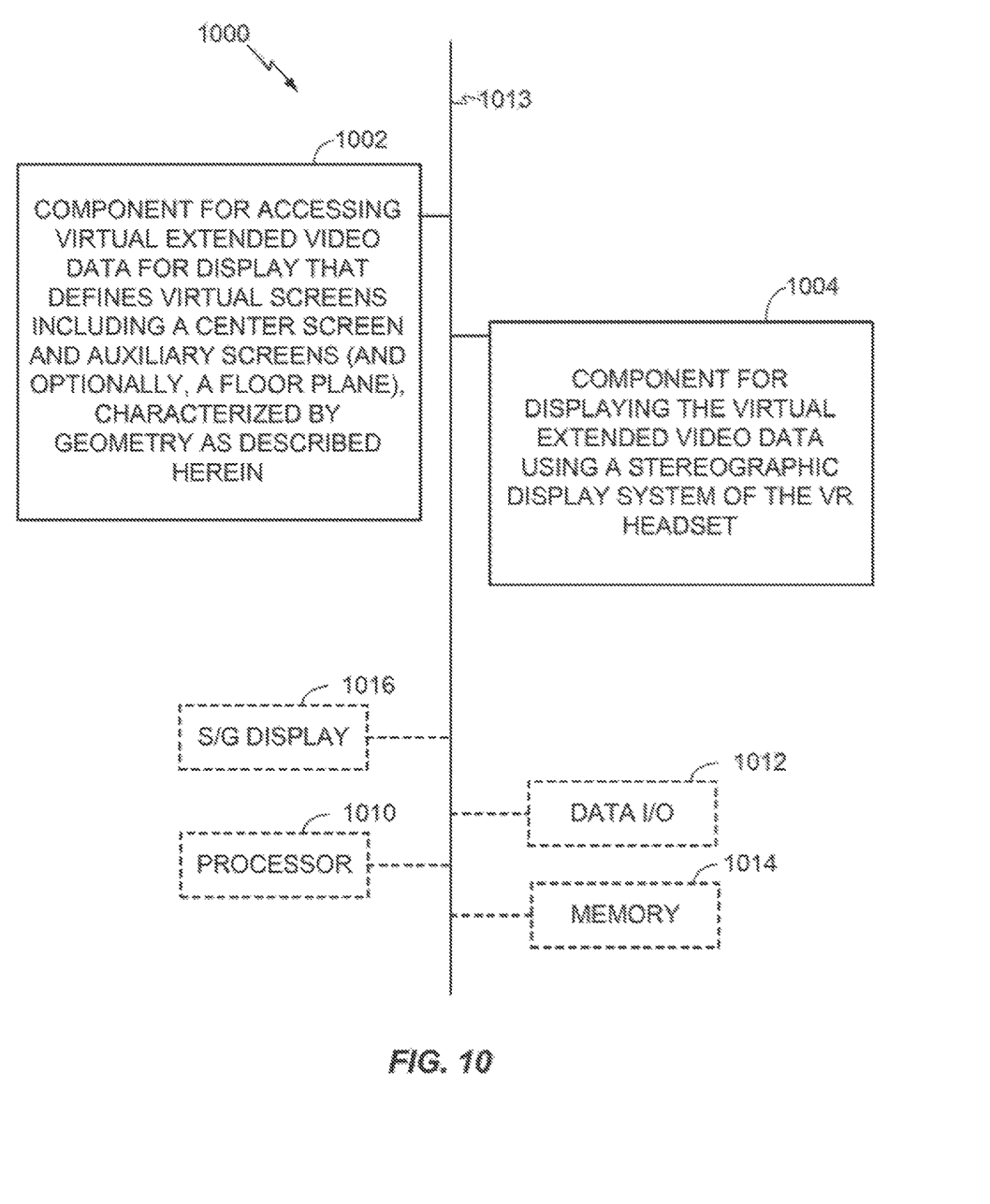
FIG. 10 is a conceptual block diagram illustrating components of an apparatus or system for presenting extended video in virtual reality.

FIG. 10 is a conceptual block diagram illustrating components of an apparatus or system 1000 for processing extended video data for display by a virtual reality display apparatus, as described herein. The apparatus or system 1000 may include additional or more detailed components for performing functions or process operations as described herein. For example, the processor 1010 and memory 1014 may contain an instantiation of a process for processing extended video data for display by a virtual reality display apparatus using virtual screens as described herein above. As depicted, the apparatus or system 1000 may include functional blocks that can represent functions implemented by a processor, software, or combination thereof (e.g., firmware).

As illustrated in FIG. 10, the apparatus or system 1000 may comprise an electrical component 1002 for accessing, by a virtual reality display apparatus, virtual extended video data for display that defines virtual screens including a center screen and auxiliary screens. The virtual center and auxiliary screens may be characterized by geometry as described above in connection with FIGS. 2-3B. For example, tangent lines to each of the auxiliary screens at their respective centers of area intersect with a tangent line to the center screen at its center of area at equal angles in a range of 75 to 105 degrees, and other geometric features as have already been described in detail herein above. The component 1002 may be, or may include, a means for said accessing. Said means may include the processor 1010 coupled to the memory 1014, the transceiver 1012, and to the stereographic display 1016, the processor executing an algorithm based on program instructions stored in the memory. Such algorithm may include a sequence of more detailed operations, for example, opening a data file, or connecting to a data stream, using a real-time VR rendering application or component thereof, wherein the data file defines 3D geometry of the virtual center and auxiliary screens in a format readable by the rendering application or component.

The apparatus 1000 may further include an electrical component 1004 for displaying the virtual extended video data using a stereographic display system of the VR headset. The component 1004 may be, or may include, a means for said displaying. Said means may include the processor 1010 coupled to the memory 1014 and to a sensor (not shown), the processor executing an algorithm based on program instructions stored in the memory. Such algorithm may include a sequence of more detailed operations, for example, receiving output from one or more sensors of the VR display apparatus, changing the rendering viewpoint based on the sensor output, and rendering one or more video frames of the extended video content in real time based on the rendering viewpoint, virtual screen geometry, extended video data and other rendering parameters, outputting the virtual extended video data for display using a stereographic display system of the VR headset, and optionally, displaying the virtual extended video data on the display.

The apparatus 1000 may optionally include a processor module 1010 having at least one processor. The processor 1010 may be in operative communication with the modules 1002-1004 via a bus 1013 or similar communication coupling. The processor 1010 may effect initiation and scheduling of the processes or functions performed by electrical components 1002-1004.

In related aspects, the apparatus 1000 may include a network interface module (not shown) operable for communicating with system components over a computer network, instead of or in addition to the transceiver 1012. A network interface module may be, or may include, for example, an Ethernet port or serial port (e.g., a Universal Serial Bus (USB) port). In further related aspects, the apparatus 1000 may optionally include a module for storing information, such as, for example, a memory device 1014. The computer readable medium or the memory module 1014 may be operatively coupled to the other components of the apparatus 1000 via the bus 1013 or the like. The memory module 1014 may be adapted to store computer readable instructions and data for effecting the processes and behavior of the modules 1002-1004, and subcomponents thereof, or the processor 1010, or the method 900 and one or more of the additional operations disclosed herein in connection with method 900. The memory module 1014 may retain instructions for executing functions associated with the modules 1002-1004. While shown as being external to the memory 1014, it is to be understood that the modules 1002-1004 can exist within the memory 1014.

The apparatus 1000 may include a data input/output component 1012, for example, any one or more of a wireless transmitter/receiver, a wired transmitter/receiver, a sensor array, or network interface, for transmitting and receiving a communication signal to/from another system component. In alternative embodiments, the processor 1010 may include networked microprocessors from devices operating over a computer network. In addition, the apparatus 1000 may include a stereographic display or other immersive display device 1016 for displaying immersive content. The stereographic display device 1016 may be, or may include, any suitable stereographic AR or VR output device as described herein above, or as otherwise known in the art.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for transforming video data for display in virtual reality, the method comprising:
receiving digital video data for display on a center screen and two auxiliary screens;
accessing, by a computer executing a rendering application, data that defines virtual screens including a center screen and auxiliary screens, wherein tangent lines to each of the auxiliary screens at their respective centers of area intersect with a tangent line to the center screen at its center of area at equal angles in a range of 75 to 105 degrees, each of the virtual screens is characterized by a having a cylindrical radius of curvature 'R' in a plane parallel to top and bottom edge of each virtual screen and a ratio $R/z_2$ wherein '$z_2$' indicates height of each of the virtual screens is in a range of 1 to 4;
preparing virtual video data at least in part by rendering the digital video on corresponding ones of the virtual screens; and
saving the virtual video data in a computer memory.

2. The method of claim 1, wherein the data that defines the virtual screens further defines each of the auxiliary screens as having parallel tangents at their respective centers.

3. The method of claim 1, further comprising accessing data that defines a virtual floor plane parallel to and located a distance '$z_1$' below the bottom edge of each virtual screen, wherein $z_1$ is equal to or within 20% of $0.9*z_2$.

4. The method of claim 1, wherein the data that defines the virtual screens further defines that each of the virtual screens has a width 'W' measured along its respective one of the tangent lines such that a ratio $W/z_2$ is in a range of 1.8 to 3.6.

5. The method of claim 4, wherein the data that defines the virtual screens further defines that the auxiliary screens face each other and are spaced apart a distance '2C' measured at their respective centers of area, wherein a ratio of 2C/W is in a range of 1 to 1.5.

6. An apparatus for transforming video data for display in virtual reality, comprising:
a processor, a memory coupled to the processor, and a stereoscopic display device coupled to the processor, wherein the memory holds instructions that when executed by the processor, cause the apparatus to perform the operations of:
receiving digital video data for display on a center screen and two auxiliary screens;
accessing, by a computer executing a rendering application, data that defines virtual screens including a center screen and auxiliary screens, wherein tangent lines to each of the auxiliary screens at their respective centers of area intersect with a tangent line to the center screen at its center of area at equal angles in a range of 75 to 105 degrees, each of the virtual screens is characterized by a having a cylindrical radius of curvature 'R' in a plane parallel to top and bottom edge of each virtual screen and a ratio $R/z_2$ wherein '$z_2$' indicates height of each of the virtual screens is in a range of 1 to 4;
preparing virtual video data at least in part by rendering the digital video on corresponding ones of the virtual screens; and
saving the virtual video data in a computer memory.

7. The apparatus of claim 6, wherein the memory holds further instructions that defines each of the auxiliary screens as having parallel tangents at their respective centers.

8. The apparatus of claim 6, wherein the memory holds further instructions that defines each of the virtual screens having a width 'W' measured along its respective one of the tangent lines such that a ratio $W/z_2$ is in a range of 1.8 to 3.6, that the auxiliary screens face each other and are spaced apart a distance '2C' measured at their respective centers of area, wherein a ratio of 2C/W is in a range of 1 to 1.5.

9. The apparatus of claim 6, wherein the memory holds further instructions that defines a virtual floor plane parallel to and located a distance '$z_1$' below the bottom edge of each virtual screen, wherein $z_1$ is equal to or within 20% of $0.9*z$.

10. An apparatus for processing video data for display by a virtual reality display apparatus, comprising:
a processor, a memory coupled to the processor, and a stereoscopic display device coupled to the processor, wherein the memory holds instructions that when executed by the processor, cause the apparatus to perform:
accessing virtual video data for display that defines virtual screens including a center screen and auxiliary screens, wherein tangent lines to each of the auxiliary screens at their respective centers of area intersect with a tangent line to the center screen at its center of area at equal angles in a range of 75 to 105 degrees, each of the virtual screens is characterized by a having a cylindrical radius of curvature 'R' in a plane parallel to top and bottom edge of each virtual screen and a ratio $R/z_2$ wherein '$z_2$' indicates height of each of the virtual screens is in a range of 1 to 4; and
outputting the virtual video data for display using a stereographic display system of the VR headset.

11. The apparatus of claim 10, wherein the memory holds further instructions that define orientation of each of the auxiliary screens such that their tangents are parallel.

12. The apparatus of claim 10, wherein the memory holds further instructions that define a virtual floor plane parallel to and located a distance '$z_3$' below the bottom edge of each virtual screen, wherein $z_3$ is equal to or within 20% of $0.9*z_2$.

13. The apparatus of claim 10, wherein the memory holds further instructions that define each of the virtual screens has a width 'W' measured along its respective one of the tangent lines such that a ratio $W/z_2$ is in a range of 1.8 to 3.6.

14. The apparatus of claim 13, wherein the memory holds further instructions that define that the auxiliary screens face each other and are spaced apart a distance '2C' measured at their respective centers of area, wherein a ratio of 2C/W is in a range of 1 to 1.5.

* * * * *